July 20, 1926.

T. MIDGLEY, JR 1,592,953

METHOD AND MEANS FOR TREATING MOTOR FUELS

Filed Oct. 4, 1922

Witnesses
Wm. P. Vasco.
J. D. Hardesty

Inventor
Thomas Midgley Jr.
By Joe W. Morrison
His Attorney

Patented July 20, 1926.

1,592,953

UNITED STATES PATENT OFFICE.

THOMAS MIDGLEY, JR., OF DAYTON, OHIO, ASSIGNOR, BY MESNE ASSIGNMENTS, TO GENERAL MOTORS CORPORATION, OF DETROIT, MICHIGAN, A CORPORATION OF DELAWARE.

METHOD AND MEANS FOR TREATING MOTOR FUELS.

Application filed October 4, 1922. Serial No. 592,435.

This invention relates to treating motor fuels, such, for example as kerosene and gasoline, by adding thereto a knock suppressing substance to increase the critical compression pressure of the fuels.

Heretofore, so far as I am aware, knock suppressing substances have been handled in bulk and a small quantity of a substance in a liquid or powdered form has been measured into the fuel. This method is inconvenient especially where the consumer carries the substance in bulk in an automobile and measures a predetermined amount into the fuel as it is purchased.
The principal objects of the present invention are to improve the method and means for transporting and handling knock suppressing substances and adding these substances to fuels.
One form of my invention and a method of carrying out the same are illustrated in the accompanying drawings, in which—

Figure 1:
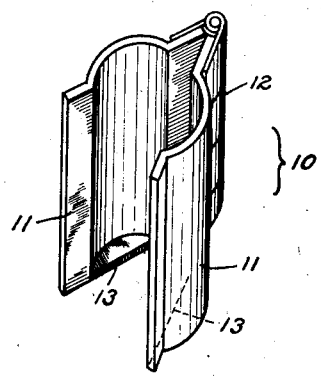
Fig. 1 is a perspective view of a mold, shown in open position, employed in forming a pellet containing a knock suppressing substance.
Figure 2:
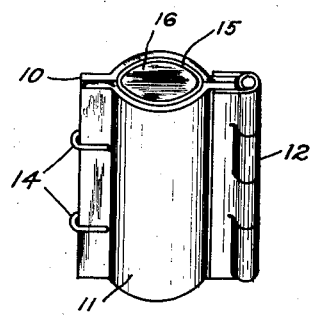
Figs. 2, 3 and 4 illustrate steps in the forming of a pellet.

Where the knock suppressing substance is added manually to a fuel it is highly desirable to encase a predetermined amount of the knock suppressing substance in a cover or container. The use of an outer covering is especially desirable where the substance is poisonous. In carrying out my invention with tetra ethyl lead which is liquid under normal conditions and is poisonous when large quantities of the concentrated materials are assimilated, a casing of a nonpoisonous material is formed about the substance. For this purpose I employ a split mold 10 of the general type employed in molding candles, the mold shown being of the single cavity type. This mold has sections 11, 11, joined by a hinge 12, the sections being formed with a split bottom plate 13 which closes the lower end of the mold. Clamps 14 secure the mold sections in closed positions.

Paraffin is melted, the mold is filled with the paraffin and the latter is permitted to stand in the mold until the mold walls have chilled the paraffin adjacent thereto and formed an inner skin or shell 15 of solid paraffin lining the mold to a depth of about $\frac{1}{16}$ of an inch. The paraffin 16 which is still liquid is poured out leaving the solid paraffin shell in the mold.

Figure 3:
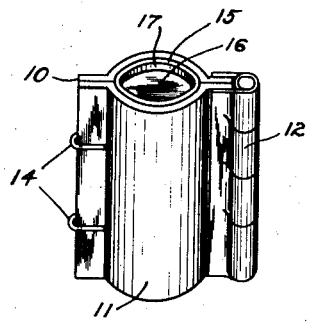
Figure 4:
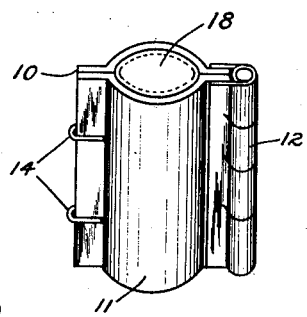
Figure 5:
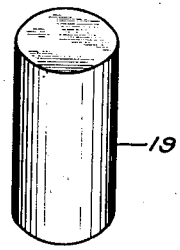
Fig. 5 is a perspective view of a completed pellet.
Figure 6:
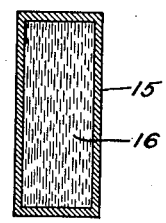
Fig. 6 is a longitudinal sectional view thereof.

50 parts of para-toluidine is heated to about 60° C. to render it liquid, and 50 parts of tetra ethyl lead is added to the molten para-toluidine forming a homogeneous mixture which is solid at ordinary temperatures. This mixture 16 (Fig. 3) is poured into the lined mold until the mold is nearly full, the mixture is cooled forming a solid core of knock suppressing substance and molten paraffin is poured into the remaining space 17 at the top of the mold and cooled to form a cap or end closure 18, Fig. 4. The mold is then opened and the completed pellet 19 consisting of a stiff shell 15 of a nonpoisonous material encasing a solid knock suppressing substance 16 is removed.

The pellet is placed in the fuel, for example, kerosene, to be treated, the paraffin, tetra ethyl lead and paratoluidine dissolving therein. A 10 cubic centimeter pellet will increase the critical compression pressure of kerosene from 50 pounds to about 75 pounds. The paratoluidine is also a knock suppressing substance but the use of a solid producing agent having these properties is not essential to the invention.

The paraffin employed in this method has a higher melting point than the material forming the core so that the paraffin container will remain solid when the molten core material is poured in. This process may be varied by using a material in the shell which has a lower melting point than the core, molding the core and then forming the casing about the core as by dipping the core in the molten material. If the ingredients in the core are nonpoisonous the shell may be omitted, the normally liquid portion forming the active knock suppressing part being combined with another substance to form a pellet which may be conveniently carried and handled when treating the fuel.

The pellet may be varied by using other materials in the core or shell, and by varying the proportions used, it being preferred when treating fuel in the tank of a motor vehicle to form a pellet which, when added to 10 gallons of fuel, increases the critical compression pressure of the fuel a predetermined amount. If a stiff or rigid pellet is desirable, the rigidity may be obtained either by using a rigid core, a rigid casing or both.

What I claim is as follows:—

1. A solid pellet containing tetra ethyl lead and paratoluidine.

2. A pellet comprising a paraffin container, and a solid core comprising tetra ethyl lead and paratoluidine.

In testimony whereof I hereto affix my signature.

THOMAS MIDGLEY, Jr.